US007328876B2

(12) United States Patent
Jones

(10) Patent No.: US 7,328,876 B2
(45) Date of Patent: Feb. 12, 2008

(54) CUP HOLDER INSERT FOR A CONSOLE

(76) Inventor: Timothy Jones, 13289 Pintail La., Princess Anne, MD (US) 21853

( * ) Notice: Subject to any disclaimer, the term of this patent is extended or adjusted under 35 U.S.C. 154(b) by 0 days.

(21) Appl. No.: 10/935,354

(22) Filed: Sep. 7, 2004

(65) Prior Publication Data
US 2005/0082455 A1 Apr. 21, 2005

Related U.S. Application Data

(60) Provisional application No. 60/500,436, filed on Sep. 5, 2003.

(51) Int. Cl.
A47K 1/08 (2006.01)

(52) U.S. Cl. ............... 248/311.2; 220/694.1; 220/739; 224/926

(58) Field of Classification Search ........... 248/311.2, 248/146, 310; 150/154, 901; 383/118, 121.1; 215/395; 220/694, 694.1, 737, 739, 903; 224/926
See application file for complete search history.

(56) References Cited

U.S. PATENT DOCUMENTS

| 1,965,227 | A | * | 7/1934 | Fiero ..................... 206/521 |
| 4,040,549 | A |   | 8/1977 | Sadler .................... 224/29 |
| 4,293,015 | A | * | 10/1981 | McGough ................ 220/739 |
| 4,382,507 | A |   | 5/1983 | Miller .................... 206/204 |
| 4,546,946 | A |   | 10/1985 | Jenison ................... 248/346.1 |
| 4,621,808 | A | * | 11/1986 | Orchard et al. .............. 482/105 |
| 4,756,497 | A | * | 7/1988 | Lan ....................... 248/205.9 |
| 4,798,063 | A | * | 1/1989 | Rimmer .................... 62/457.4 |
| 5,005,374 | A | * | 4/1991 | Spitler .................... 62/259.3 |
| 5,022,235 | A | * | 6/1991 | Grissom .................... 62/457.4 |
| 5,285,953 | A |   | 2/1994 | Smith ...................... 229/1.5 H |
| 5,318,821 | A | * | 6/1994 | Bradley, Jr. ............... 428/100 |
| 5,337,984 | A |   | 8/1994 | Houck ..................... 248/146 |
| 5,680,944 | A | * | 10/1997 | Rueter ..................... 215/13.1 |
| 5,938,162 | A |   | 8/1999 | Honjo .................... 248/346.11 |
| 5,960,984 | A | * | 10/1999 | Weston ..................... 220/739 |
| D423,299   | S | * | 4/2000 | Burrus .................... D7/607 |
| 6,315,153 | B1 |  | 11/2001 | Osborn .................... 220/737 |
| 6,478,147 | B1 |  | 11/2002 | Brander et al. ............ 206/204 |
| 6,543,637 | B1 |  | 4/2003 | Osborn .................... 220/737 |
| 6,578,809 | B1 | * | 6/2003 | Dimella ................... 248/346.11 |
| 6,581,888 | B1 | * | 6/2003 | Castillo ................... 248/146 |

* cited by examiner

Primary Examiner—Korie Chan
(74) Attorney, Agent, or Firm—Angenehm Law Firm; N Paul Friederichs

(57) ABSTRACT

A cup holder, including a cover being formed of an elasticized piece of material and having an upper opening providing access to an interior pocket, the upper opening and interior pocket being defined by an interior side and bottom of the cover, and the cover having an exterior side, the upper opening having a non-stretched position and a stretched position, the upper opening having a diameter in the non-stretched position less than ninety percent of the size of a diameter of a beverage container and the upper opening having a diameter in the stretched position sufficient to secure about the beverage container.

3 Claims, 3 Drawing Sheets

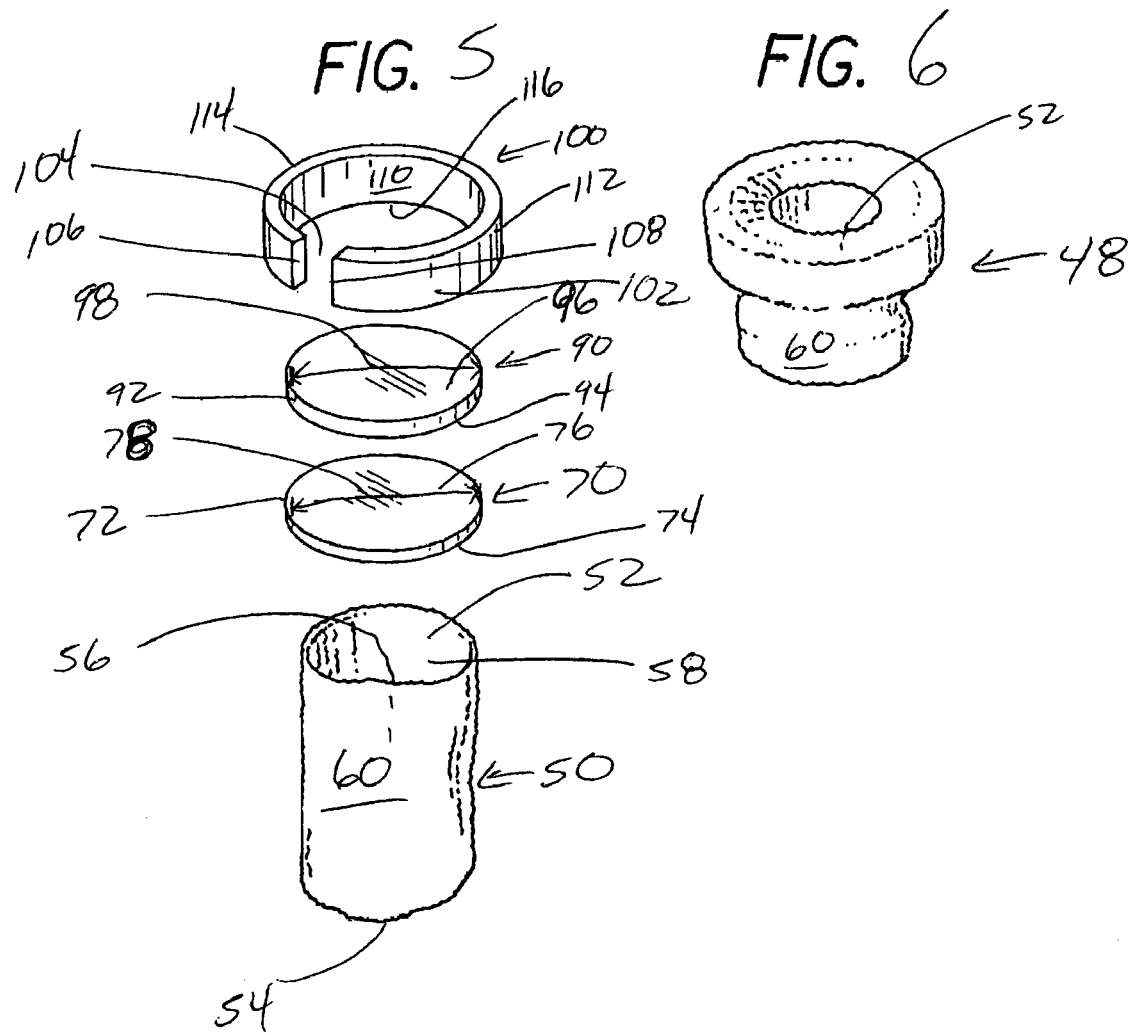
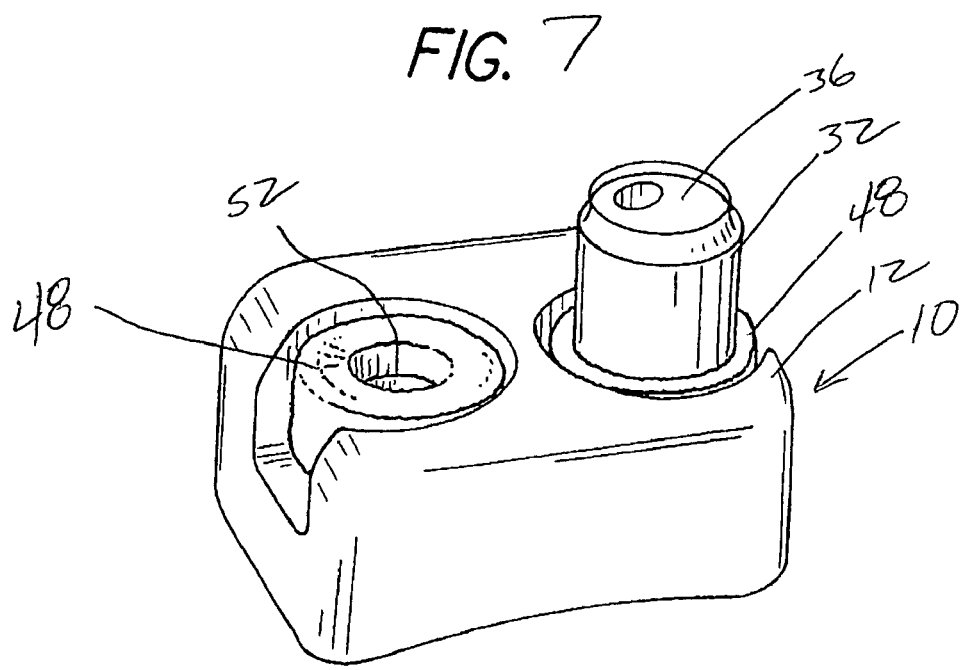

CUP HOLDER INSERT FOR A CONSOLE

FIELD OF THE INVENTION

The present invention relates to cup holders for maintaining the temperature of a beverage and more particularly to cup holders that fit vehicle consoles and adjust to the size of a beverage container, claiming priority from Provisional patent application 60/500,436, filed Sep. 5, 2003 and entitled CUP HOLDER INSERT FOR A CONSOLE.

BACKGROUND OF THE INVENTION

Temperature control beverage holders have been around for a substantial period of time. Initially, the insulative element was part of the beverage container. Perhaps as pop or soda can changed from steel to aluminum and became thinner walled insulators, sometimes referred to as "can coolies" entered the market. These insulators, generally formed of foam, are removable joined about the lower portion of a pop can. Such foam has a minor amount of adjustability in diameter. Quite rapidly, however, the beverage container can be so small that it will not engage the insulator or too large that it will not fit into the insulator. For this reason, the insulators are generally only made for canned beverages, which tend to come in a standard sized diameter. Moreover, the insulators tend not to be absorbent, absorbing the sweat that a cold beverage may collect on a sultry day.

Holders have been developed for odd shaped containers, e.g. coffee cups. These too have too rigid of a supporting structure to provide substantial adjustability in size or shape of the container. For instance, Houck disclosed an invention in U.S. Pat. No. 5,337,984 entitled Thermal Holders for Cups for Use in Vehicles. This box shaped design has slits for receiving the ear of a coffee cup and includes an absorbent pad on the bottom of the box. The invention is not suitable unless one has the proper sized beverage container and a place to set the box.

Other non-adjustable beverage holders are disclosed in U.S. Pat. No. 6,478,147 entitled Container with Absorbent Material issued to Brander et al.; U.S. Pat. No. 4,040,549 entitled Three in One Car Cup and Holder issued to Sadler; U.S. Pat. No. 4,546,946 entitled Coaster with Removable Support Plate issued to Jenison; U.S. Pat. No. 5,285,953 entitled Beverage Cup Holder issued to Smith; U.S. Pat. No. 6,543,637 entitled Adapter for Cup Holders issued to Osborn; and U.S. Pat. No. 6,315,153 entitled Adapter for Cup Holders also issued to Osborn. Insulation and absorbency may be included in some of these inventions.

Use of absorbent materials has been found in patents other than Houck including Shaffer et al. (U.S. Pat. No. 4,953,823 entitled Coaster and Wipe; Miller (U.S. Pat. No. 4,82,507 entitled Absorbent Pad; and Honjo (U.S. Pat. No. 5,938,162) entitled Coaster. Absorbency can be as a result of spillage or sweating of the container, although these inventions do not include an absorbency feature for wiping the sweat off a container. Rather the sweat must drip down the side of the container to the pad which is located underneath the container.

So common are beverage holders that most vehicles come with such holders as a standard feature. These holders are generally rigid and often do not fit containers of desired beverages well. The holders are often oversized to some degree to allow more containers to fit within, but this has a limit as the containers, not well secured, lack insulation and tend to tip over while in route.

What is needed is an adjustable beverage holder that is sufficiently adjustable in size to fit beverage containers of most all sizes. The holder should fit within a beverage holder of a vehicle console. The holder should be removable, staying with the beverage until consumed and should provide insulative value to the container. Moreover, the holder should have and absorbency feature, desirably wiping the sides of the container, avoiding the need for the sweat to reach the bottom of the container.

SUMMARY OF THE INVENTION

The present invention is an adjustable beverage insert that is sufficiently adjustable in size to fit beverage containers of most all sizes. Insert is used herein and throughout as a specialized holder that acts both as a holder that may be inserted into a second holder. The insert fits within a beverage holder of a vehicle console. The insert may be removable, staying with the beverage until consumed and provides insulative value to the container. Moreover, the insert has and absorbency feature, sized and positioned to wipe the sides of the container, avoiding the need for the sweat to reach the bottom of the container.

The present invention is a cup holder insert for a console, which may include a vehicle console with a cup holder and an insert joined in the cup holder. The insert may include a cover being formed of an elasticized piece of material. An upper opening is defined in the insert providing access to an interior pocket. The material is sufficiently absorbent to collect moisture from an exterior of a beverage container. The upper opening and interior pocket are defined by an interior side and bottom of the cover and the cover has an exterior side. The upper opening has a non-stretched diameter less than ninety percent of the size of a diameter of a beverage container and a stretched diameter sufficient to secure about a beverage container.

Advantageously, the present invention fits beverage containers of a wide variety of sizes.

Also advantageously, the present invention is sized to fit into a console of standard proportions, while holder smaller diameter beverage containers such as pop cans.

As yet a further advantage the present insert is made of an absorbent material, preferably terry cloth.

Further advantageously, the present invention provides insulative value to maintain temperature of the contained beverage.

These and other advantages will be made clear through reading the below description with reference to the drawings.

DESCRIPTION OF THE DRAWINGS

FIG. 5 is an exploded view of the cup holder;

FIG. 6 is a perspective view of the cup holder; and

FIG. 7 is a perspective view of the cup holder about a beverage container in a console;

DETAILED DESCRIPTION

Figure 1:
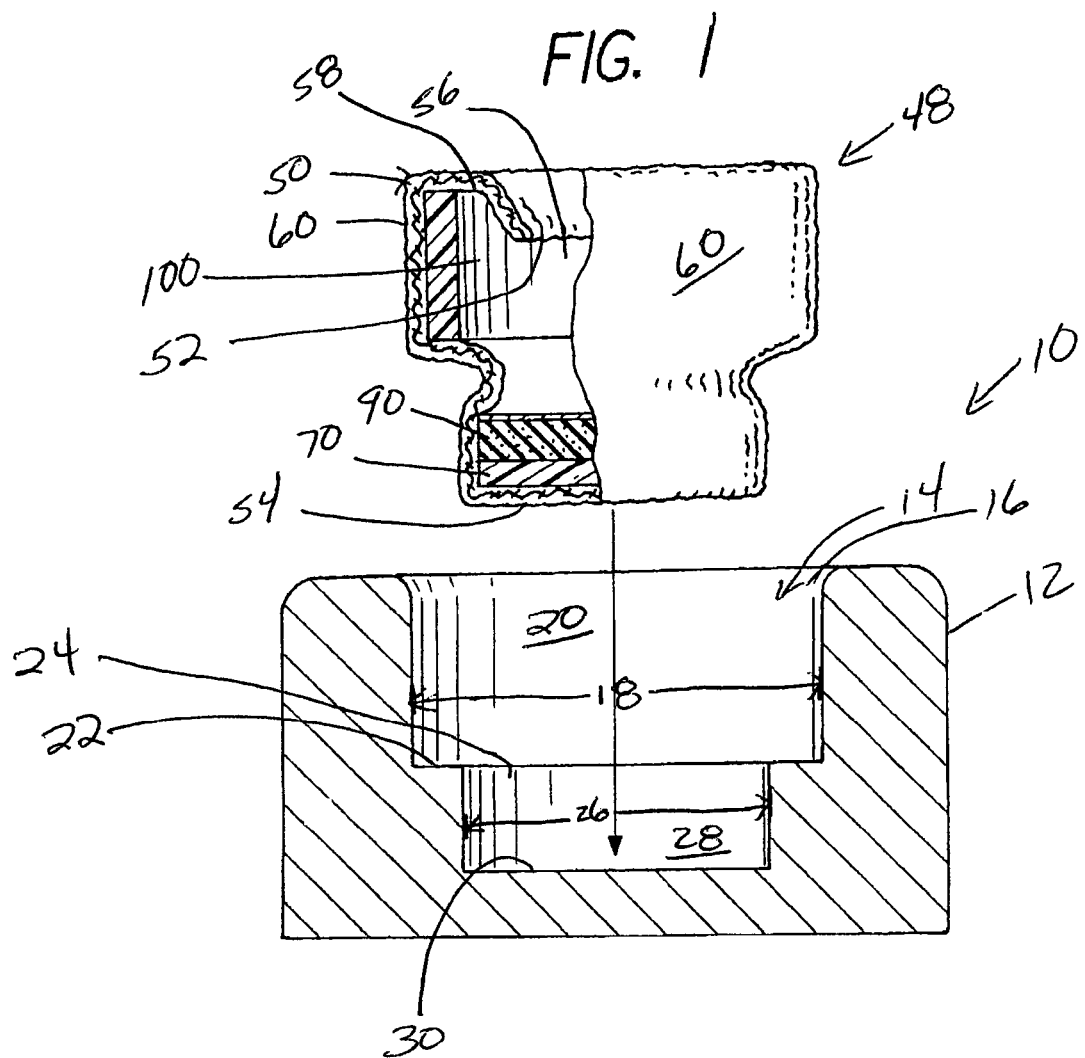
FIG. 1 is a side view of the present invention partially cut away elevated above a console shown in cross section.
Figure 2:
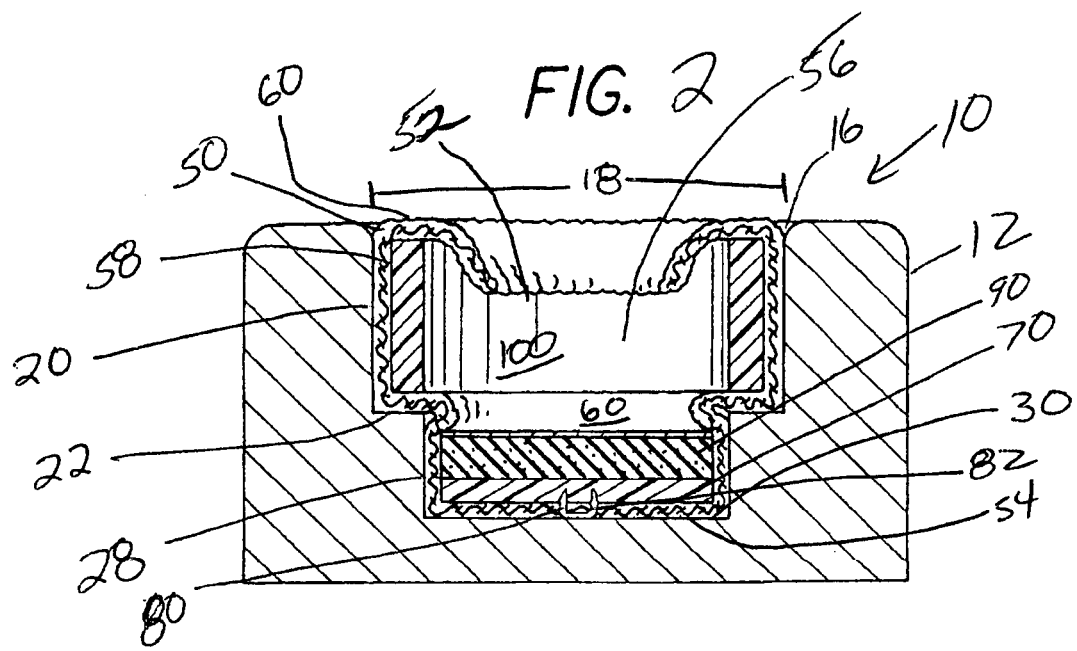
FIG. 2 is a side view in cross-section of the cup holder in a console.
Figure 3:
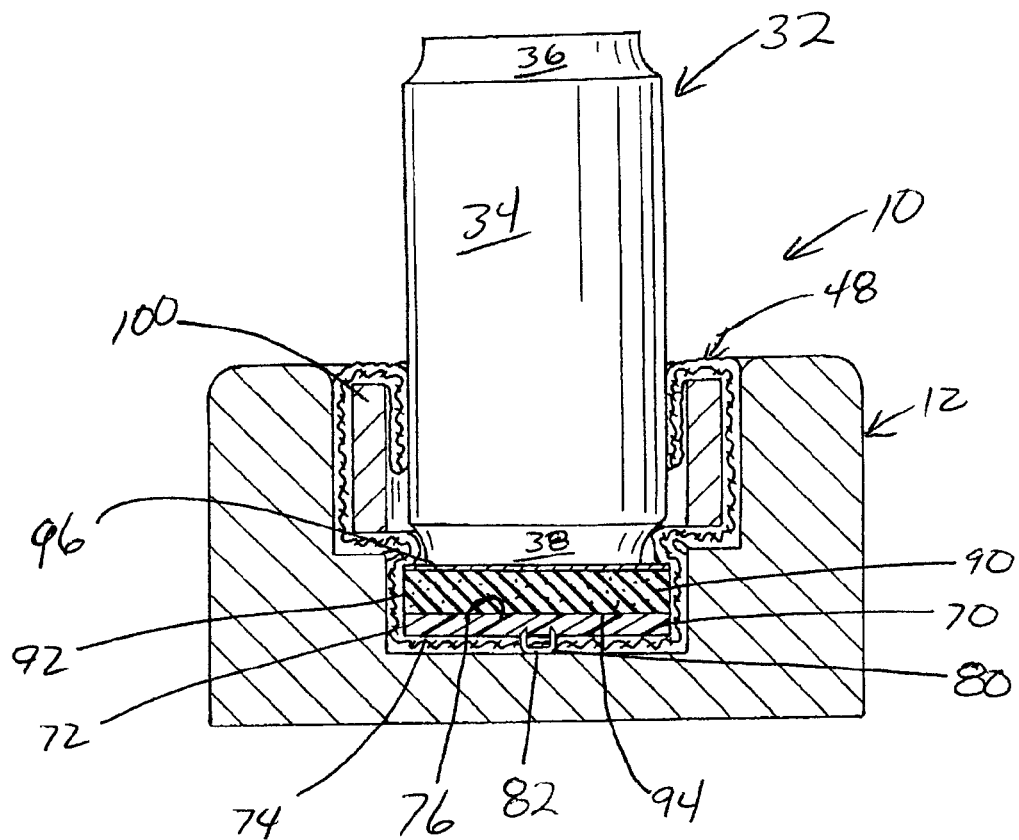
FIG. 3 is a side view in cross-section of the cup holder in a console with a beverage container, not in cross section, therein.
Figure 4:
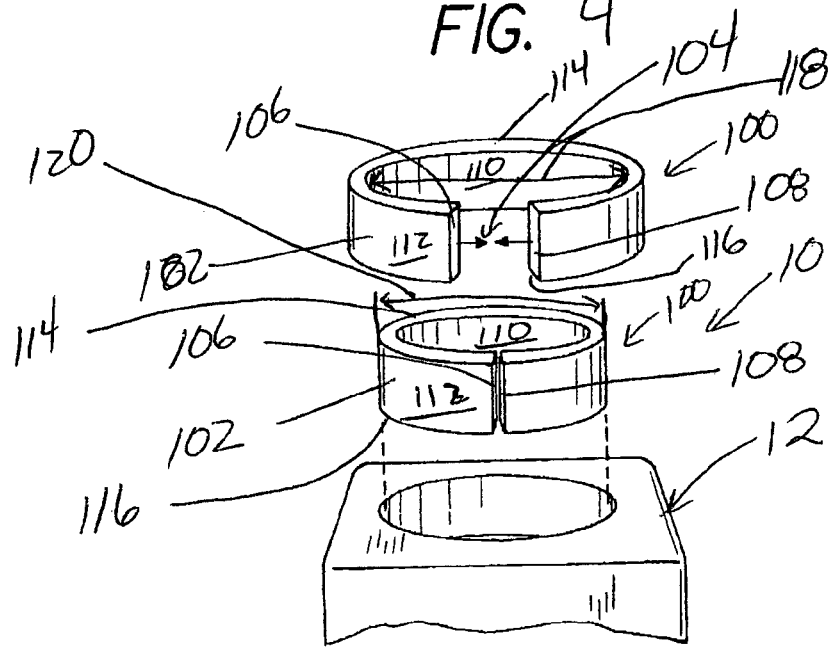
FIG. 4 is a perspective view of portions of the cup holder elevated above a console.

The cup holder insert 10 for a console 12 may provided with a cup holder 14 and an insert 48. The insert 48 may be provided with a cover 50, a base plate 70, an attachment mechanism 80, an absorbent pad 90 and an upper support 100. The cup holder insert 10 is suited to being used in a variety of market available consoles and adjusts to fit a wide variety of different sized beverage containers 32.

The vehicle console 12 may include one or more cup holders 14, change dish (not shown) and a variety of other standard features. The cup holder 14 may have an upper opening 16, an upper circumferential wall 20, and an upper bottom wall 22. The upper circumferential wall 20 defines an inner diameter 18. The upper bottom wall 22 is joined to the upper circumferential wall 20 preferably in a monolithic, homogeneous, or integral manner.

The cup holder 14 may further have a lower opening 24, a lower circumferential wall 28 and a lower bottom wall 30. The lower opening 24 may be defined through the upper bottom wall 22 and by the lower circumferential wall 28. The lower circumferential wall 28 may define a lower diameter 26. The upper bottom wall 22 and the lower bottom wall 30 may be joined to the lower circumferential wall 28 preferably in a monolithic, homogeneous, or integral manner.

Other cup holders known within the field of consoles may be used in lieu of the aforedescribed console 12 and cup holder 14. That is, the pliable form of the insert 48, described below, allows the insert 48 to form fit a wide variety of preformed cup holders 14. Alternatively, the insert 48 may operate as a stand alone beverage container insulator. The insert 48 may include a cover 50, a base plate 70 an absorbent pad 90 an and upper support 100, which will be discussed in serial fashion.

The cover 50 preferably is formed of an elasticized piece of material, having a 50% or more increase in size between a constricted stated and an expanded state. For instance, the cover 50 may be structured similar to a foot-wear type sock or most preferably elasticized terry cloth. The material is sufficiently absorbent to collect moisture from an exterior of a beverage container and preferably sufficiently absorbent to collect substantially all moisture from an exterior of a cold beverage container. The cover 50 may have an upper opening 52 providing access to an interior pocket 56. An interior side 58 and a bottom 54 of the cover 50 may define the upper opening 52 and interior pocket 56. The cover 50 may further have an exterior side or surface 60. The cover 50 may be absorbent to wipe the condensation from the container 32 is it is being placed in or being removed from the cover 50.

The base plate 70 may have a bottom surface 74, an upper surface 76 and a circumferential wall 72. The bottom surface 74 may be joined to the bottom 54 of the cover 50. The circumferential wall 72 may define a base plate diameter 78 with the base plate diameter 78 being smaller than the lower diameter 26 of the cup holder 14. Such a diameter relationship allows the base plate to be positioned adjacent the lower bottom 30 of the cup holder 14 as shown in the Figures.

A mechanism 80 may attach the cover 50 to the base plate 70. A suitable mechanism is a staple 82. Other attachment mechanisms such as adhesives, screws, welds or any other mechanism for attachment known in the art may be used. Alternatively, the base plate 70 may be removable positioned adjacent the bottom 54 of the cover 50 with or without a mechanism 80 for attachment.

The absorbent pad 90 may have an upper surface 96, a bottom surface 94 and a circumferential wall 92. The bottom surface 94 may be joined to, or merely positioned adjacent to, the upper surface 76 of the base plate 70. The circumferential wall 92 may define a diameter 98. The diameter 98 of the absorbent pad 90 preferably is smaller than the lower diameter 26 of the cup holder 14. Such a diameter relationship allows the absorbent pad 90 to be positioned adjacent the base plate 70 and lower bottom 30 of the cup holder 14 as shown in the Figures. The absorbent pad 90 is formed of a material suitable for catching and holding sweat from a beverage container 32.

The upper support 100 may have a circumferential wall 102. The circumferential wall 102 preferably defines a slot 104 therethrough, although such does not need to be the case, positioned between a first slot end 106, a second slot end 108 of the circumferential wall 102. The circumferential wall 102 may further have an interior surface 110, an exterior surface 112, an upper surface 114 and a lower surface 116. The circumferential wall 102 defines an inner diameter 118 and an outer diameter 120. The upper support 100, therefore, can be positioned in the cover 50 such that the lower surface 116 of the upper support 100 is situated above the upper bottom wall 22 of the cup holder 14 and the upper opening 52 of the cover 50 may be positioned below the upper surface 114 of the upper support 100. Since the cover 50 is of a flexible elasticized piece of material, the upper opening 52 of the cover 50 may reposition above or below the upper surface 114 of the upper support 100 during use.

The beverage container 32 may have a side 34, a top 36 and a bottom 38. The bottom of the beverage container 32 may be in contact with the upper surface 96 of the absorbent pad 90 and the side being 34 in circumferential contact with the cover 50 adjacent the opening 52 of the cover 50. Suitable containers 32 include, cups, glasses, cans, coffee cups, bottles and other such containers. The horizontal diameter of the container 32 should ben between the inner diameter 118 of the support 100, to fit, and the size of the opening 52 in the cover 50 (in a compressed or non-stretched state) to be snugly supported.

In operation, the insert 48 may be provided in an assemble fashion as shown and described. The user may place the insert 48 into a cup holder 14. In situations where the outer diameter 120 of the upper support 100 is the same size as or larger than the upper diameter 18 of the cup holder 14, the user may squeeze the pliable upper support 100, preferably formed of PVC to narrow the slot 104 and thereby shrink the outer diameter 120 of the upper support 100. In a compressed state the upper support 100 may slip down adjacent the upper circumferential wall 20 of the cup holder 14. Such a fit is desirable in that the insert 48 snugly fits the cup holder 14. A beverage container 32 may be positioned in the insert 48 as shown. The elasticized nature of the cover 50 adjusts to fit a wide variety of sizes of beverage containers 32, sufficiently to stabilize the containers 32 therein. The upper opening 52 has a non-stretched diameter less than ninety percent of the size of a diameter of a beverage container 32 and the upper opening 52 has a stretched diameter sufficient to secure about a beverage container 32. The non-stretched diameter may be seventy-five, fifty, or twenty-five percent less than the diameter of the stretched diameter. Thus, precluding spillage problems commonly associated with consoles 12 formed of hardened plastic and non-conforming beverage containers 32. The insert 48 may further be removed and kept with the beverage container 32 as a portable insulator.

Although the present invention has been described with reference to preferred embodiments, workers skilled in the art will recognize changes may be made in form and detail without departing from the spirit and scope of the invention.

The invention claimed is:

1. A cup holder insert and a vehicle console assembly, comprising:
    the vehicle console, including a cup holder, the cup holder having an upper opening and an inner diameter defined by a upper circumferential wall, an upper bottom wall joined to the upper circumferential wall, the cup holder further having a lower opening defined through the upper bottom wall, the lower opening and a lower diameter defined by a lower circumferential wall, and a lower bottom wall joined to the lower circumferential wall;
    an insert including
        a cover being formed of an elasticized piece of material, the cover having an upper opening providing access to an interior pocket, the upper opening and interior pocket being defined by an interior side and bottom of the cover, and the cover having an exterior side;
        a base plate, the base plate having a bottom surface joined to the bottom of the cover, an upper surface and a circumferential wall defining a base plate diameter, and the base plate diameter being smaller than the lower diameter of the cup holder;
        means for attaching the cover to the base plate;
        an absorbent pad having an upper surface, a lower surface joined to the upper surface of the base plate, a circumferential wall, and a diameter, and the diameter of the absorbent pad being small than the lower diameter of the cup holder; and
        an upper support having a circumferential wall, the circumferential wall defining a slot therethrough, the circumferential wall having a first slot end, a second slot end, an interior surface, an exterior surface an upper surface and a lower surface, the circumferential wall defining an inner diameter and an outer diameter, the upper support being positioned in the cover such that the lower surface of the upper support is positioned above the upper bottom wall of the cup holder and the upper opening of the cover is positioned below the upper surface of the upper support.

2. The assembly of claim 1 wherein the insert is selectively joined to the console.

3. The assembly of claim 1 further comprising a beverage container, having a side, top and bottom, the bottom of the beverage container being in contact with the upper surface of the absorbent pad and the side being in circumferential contact with the cover adjacent the opening of the cover.

* * * * *